Sept. 23, 1941.　　　F. E. KEMP　　　2,256,484
PORTABLE PAVING PLANT
Filed Jan. 3, 1939　　　2 Sheets-Sheet 1
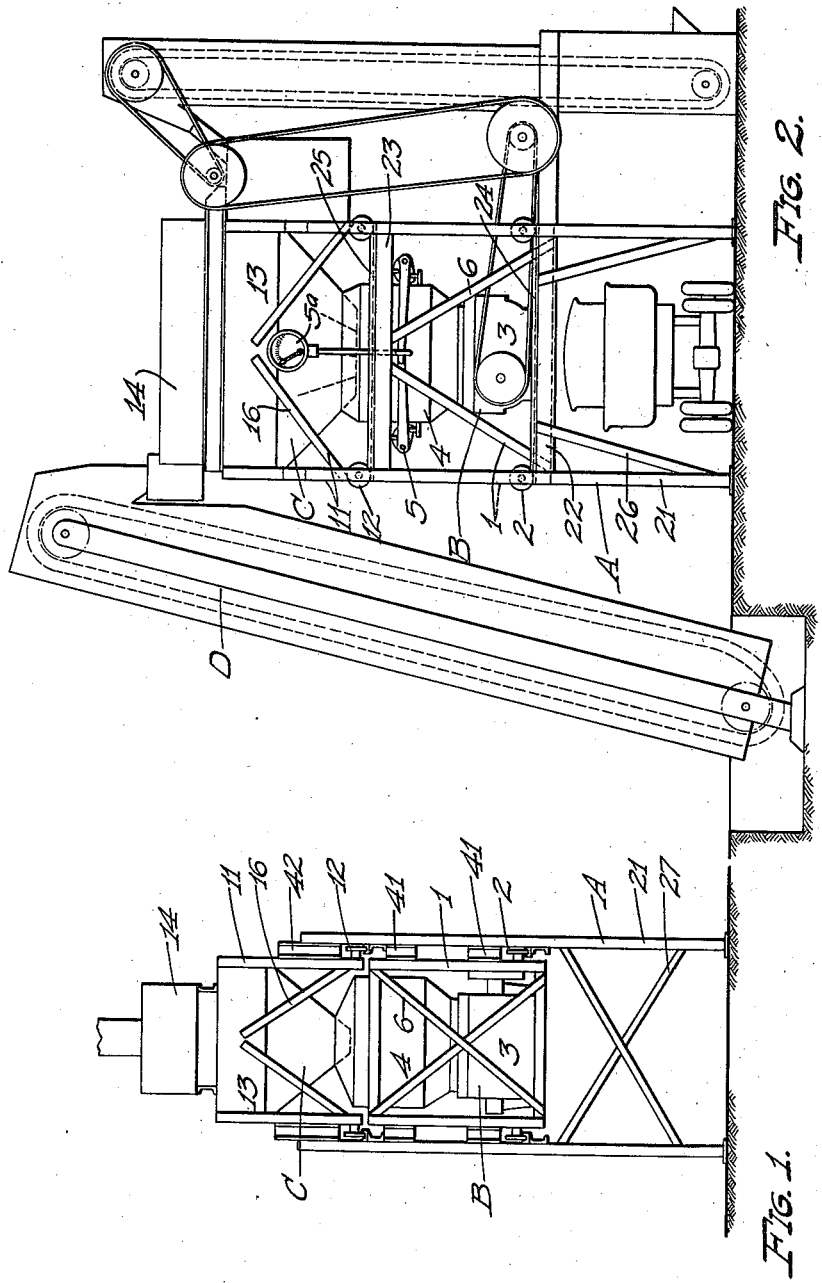
INVENTOR
FRANK E. KEMP
BY
William E. Hall
ATTORNEY.

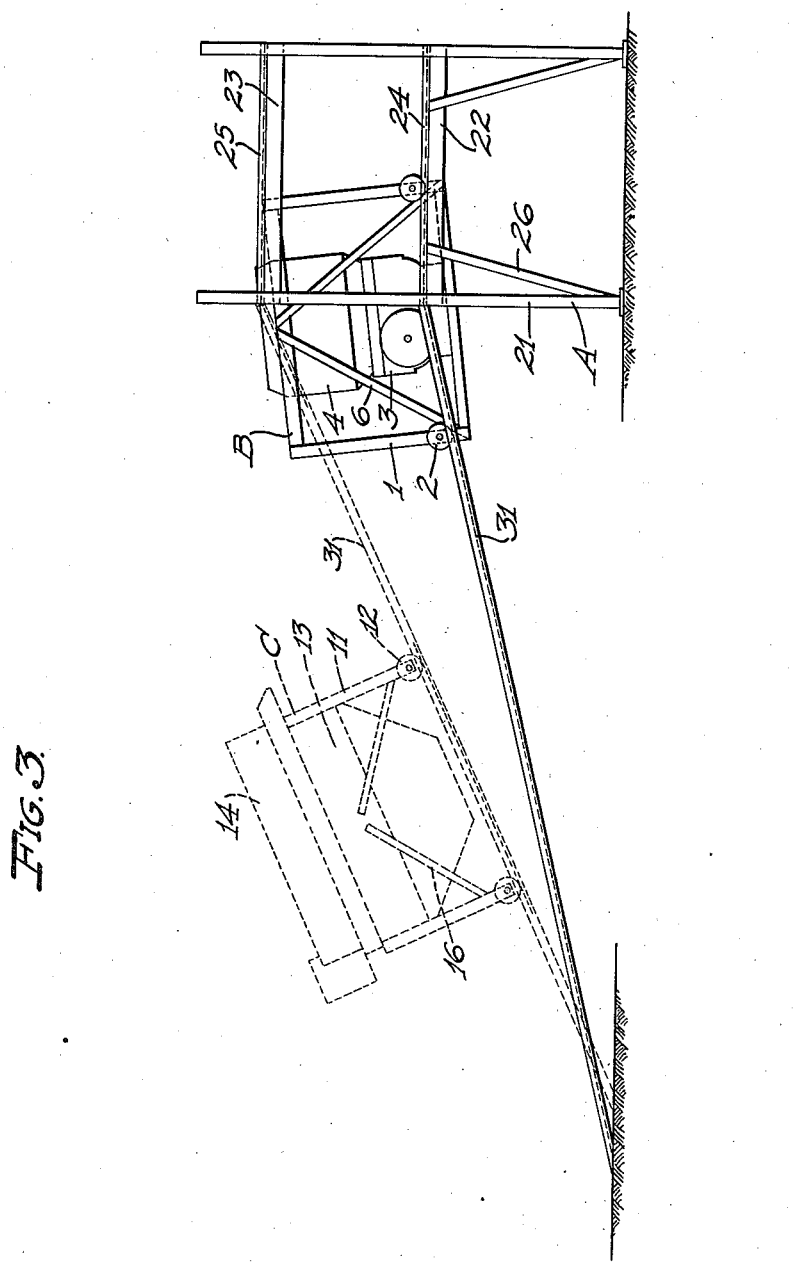

Patented Sept. 23, 1941

2,256,484

UNITED STATES PATENT OFFICE 2,256,484

PORTABLE PAVING PLANT

Frank E. Kemp, Honolulu, Territory of Hawaii

Application January 3, 1939, Serial No. 248,945

9 Claims. (Cl. 259—153)

My invention relates to portable paving plants, and particularly to a construction to facilitate erection and dismantling of the plant.

One of the principal objects of this invention is to provide a paving plant of this class, the parts of which may be easily transported from place to place, the main supporting unit easily erected, and the separate cooperating paving plant units easily and quickly placed in their normally superimposed positions on the supporting unit.

Another object of this invention is the provision of novel and simple means whereby the separate paving plant units may be readily conveyed on rollers, by means of ramps or inclined runways, to supporting tracks at different elevations on a supporting frame, to superimposed and cooperative positions.

Still another important object of this invention is the provision of simple and economical means for temporarily securing the assembled units in position into a rigid, substantially unitary, structure.

With these and other objects in view, I have devised a paving plant of this class having certain novel features of construction, combination, and arrangement of parts and portions, as will be hereinafter described in detail and particularly set forth in the appended claims, reference being had to the accompanying drawings, and to the characters of reference thereon, which form a part of this application, in which:

Fig. 1 is a side elevation of a portable paving plant structure, embodying the features of my invention in its preferred form;

Fig. 2 is an end elevation, with parts broken away to facilitate the illustration; and, Fig. 3 is a side elevation of my plant in the process of erection.

My paving plant, as illustrated in the drawings, consists primarily of a supporting frame A, and a normally lower paving plant unit B, and a normally upper paving plant unit C. The latter paving plant units are adapted to be conveyed separately from place to place, and, when set up, are superimposed for cooperative use.

The lower unit B is enclosed by and supported on a frame 1, of rectangular shape, which is mounted, near the front and back, on pairs of wheels 2.

On the lower unit B, and at the lower portion thereof, is a concrete or asphalt mixer 3. Above the mixer is located a weigh hopper 4 which is carried, at least during transportation, by the frame 1, but is attached to or suspended from a weighing apparatus 5, which may be carried by the upper unit C, or by the upper portion of the lower unit B, as shown.

The upper unit C is similarly enclosed by and supported on a frame 11, of similar shape, and mounted, near the front and back, on pairs of wheels 12.

On the frame of this upper unit is mounted a multiple bin 13 which is divided transversely into a plurality of separate bins, each of which is adapted to contain different size aggregate. Above the bin is mounted a multiple screen 14 for supplying said bins with different size aggregate.

The multiple screen may be supplied with aggregate from the bottom, that is, from the ground, by a suitable conveyor D, which is also separately transported.

The supporting frame A is preferably rectangular in plan, and, in this instance, comprises four upright standards or columns 21, which are short of the top of the upper unit C. These standards or columns are braced transversely by suitable structural elements. In this instance the uprights at each side are connected from front to rear, that is, longitudinally of the frame, and at their inner sides, by horizontal channels 22 and 23, placed on edge, the latter being positioned considerably above the former. On these channels are other channels 24 and 25, respectively, placed flatwise, forming open channel rails. The rails 24 at the opposite sides of the frame are opposed and provide a pair of rails or a track, substantialy midway between the ends of the uprights, in and upon which the wheels 2 of the lower unit B may rest, as shown. The rails 25 provide a pair of rails or a track, near the top of the uprights, in and upon which the wheels 12 of the upper unit may rest, as shown.

The uprights at the sides may be braced with respect to the horizontal channels 22 and 23 by diagonals 26. The uprights, at the opposite sides may also be braced with respect to each other by diagonals 27 below the lower rails 24.

The uprights of the unit B are braced with the horizontal beams by diagonals 6, while the uprights of the unit C are braced to the bin by diagonals 16.

The units B and C may be raised to their operative positions, on the frame A, shown in Fig. 1, by running the wheeled units, from the ground level, up inclined ramps or tracks 31. The same ramp may be used for both paving plant units. These units are moved directly from the ramps into the rails 24 and 25, as shown in Fig. 1, and are then secured in place.

The means employed for securing the paving plant units B and C in place on the frame A, consist of short lengths of H-beams secured between and directly to the uprights standards 21 and the immediately adjacent vertical members of the frames 1 and 11. Preferably two H-beam lengths secure the uprights of the frame 1 to the frame A upright standards 21, as designated by 41; while only one length, designated 42, secures each upright of the frame 11 to the adjacently positioned upright standard 21.

Though I have shown and described a particular construction, combination, and arrangement of parts and portions, I do not wish to be limited to the same, but desire to include in the scope of my invention, the construction, combination, and arrangement substantially as set forth in the appended claims.

I claim:

1. In a portable paving plant, a supporting frame having a transverse archway at the bottom, two pairs of horizontally spaced apart rails supported on and within the frame, one pair being immediately above the arch, and the other pair being spaced considerably thereabove, and a pair of cooperating paving plant units positioned in cooperative superimposed relation, one unit being removably mounted on each pair of rails.

2. In a portable paving plant, a supporting frame having a transverse archway at the bottom, two pairs of horizontally spaced apart rails supported on and within the frame, one pair being immediately above the arch, and the other pair being spaced considerably thereabove, a pair of cooperating paving plant units positioned in cooperative superimposed relation, one unit being removably mounted on each pair of rails, and a ramp for conveying each unit from the ground to its respective supporting rails.

3. In a portable paving plant, a supporting frame having a transverse archway at the bottom, two pairs of horizontally spaced apart rails supported on and within the frame at right angles to the archway, one pair being immediately above the arch, and the other pair being spaced considerably thereabove and parallel thereto, and a pair of cooperating paving plant units positions in cooperative superimposed relation, one unit being removably mounted on each pair of rails.

4. In a portable paving plant, a supporting frame comprising two pairs of upright standards, each pair being connected transversely by superimposed horizontal rails, the rails on each pair of upright standards forming horizontally opposed pairs of rails, and a pair of cooperating paving plant units positioned in cooperative superimposed relation, one unit being removably mounted on each pair of rails.

5. In a portable paving plant, a supporting frame comprising two pairs of upright standards, each pair being connected transversely by superimposed horizontal rails, the rails on each pair of upright standards forming horizontally opposed pairs of rails, a pair of cooperating paving plant units positioned in cooperative superimposed relation, one unit being removably mounted on each pair of rails, and a ramp for conveying each unit from the ground to its respective supporting rails.

6. In a portable paving plant, a supporting frame comprising two pairs of upright standards, each pair being connected transversely by superimposed horizontal rails, the rails on each pair of upright standards forming horizontally opposed pairs of rails, a pair of cooperating paving plant units positioned in cooperative superimposed relation, one unit being removably mounted on each pair of rails, and spacers securing the units in place on the rails to the upright standards.

7. In a portable paving plant, a supporting frame having a transverse archway at the bottom, two pairs of horizontally spaced apart rails supported within the frame, one pair being immediately above the arch, and the other pair being spaced considerably thereabove, and a pair of cooperating paving plant units positioned in cooperative superimposed relation, each unit having wheels adapted to ride on and support the respective unit on a pair of rails.

8. In a portable paving plant, a supporting frame comprising two pairs of upright standards, each pair being connected transversely by superimposed horizontal rails, the rails on each pair of upright standards forming horizontally opposed pairs of rails, and a pair of cooperating paving plant units positioned in cooperative superimposed relation, each unit having wheels adapted to ride on and support the respective unit on a pair of rails.

9. In a portable paving plant, a support frame having a transverse archway at the bottom, two pairs of horizontally spaced apart rails supported on and within the frame, one pair being immediately above the arch, and the other pair being spaced considerably thereabove and parallel thereto, and a pair of cooperating paving plant units positioned in cooperative superimposed relation, one unit being removably mounted on each pair of rails.

FRANK E. KEMP.